Figure 1:
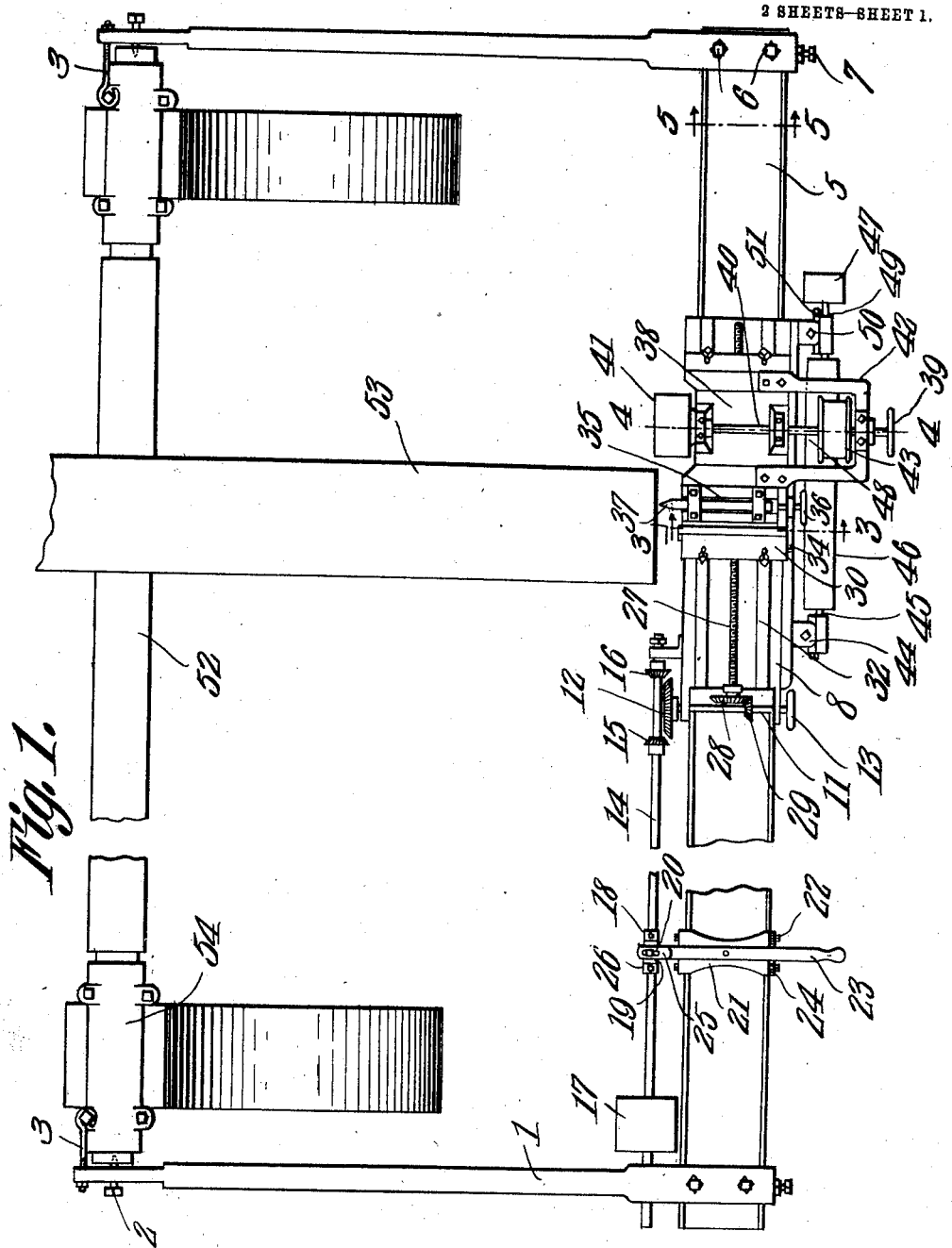

H. D. FIELDS.
MACHINE FOR REFACING BAND SAW WHEELS.
APPLICATION FILED SEPT. 2, 1910.

1,003,350.

Patented Sept. 12, 1911.

2 SHEETS—SHEET 1.

Witnesses
Frank B. Wooden.
M. E. Tracey.

Hannibal D. Fields
Inventor,
by C. A. Snow & Co.
Attorneys.

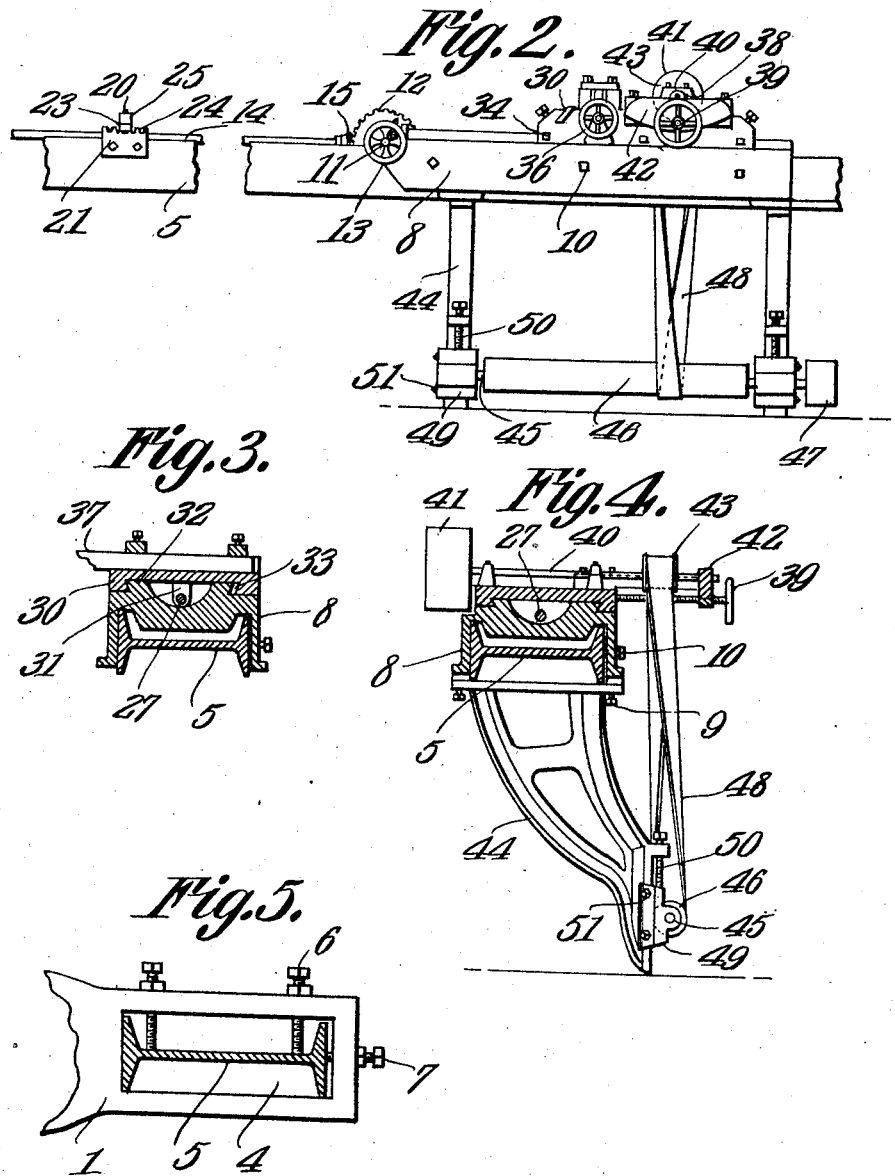

UNITED STATES PATENT OFFICE.

HANNIBAL D. FIELDS, OF LOUGHMAN, FLORIDA.

MACHINE FOR REFACING BAND-SAW WHEELS.

1,003,350.  Specification of Letters Patent.  Patented Sept. 12, 1911.

Application filed September 2, 1910. Serial No. 580,226.

*To all whom it may concern:*

Be it known that I, HANNIBAL D. FIELDS, a citizen of the United States, residing at Loughman, in the county of Polk and State of Florida, have invented a new and useful Machine for Refacing Band-Saw Wheels, of which the following is a specification.

This invention relates to machines for refacing band saw wheels, and consists in the novel construction and arrangement of its parts as hereinafter shown, described and claimed.

Preliminary to stating the object of the present invention, a brief description will be given of conditions which sooner or later exist in all band saw mills.

As a consequence of wear and from other causes, the faces of the wheels on which the band saw travels and adjacent the teeth of the saw become reduced in diameter as compared with the rear edges of the wheels which are remote from the teeth of the saw, and therefore the saw does not retain its proper strain upon the wheel and when in use has a tendency to work back toward the portions of the wheels having the greater or original diameter. This results in straining the saw and eventually causes it to rupture.

The object of the present invention is to provide a simple and effective means, in the form of an attachment, which may be applied to the upper or lower shaft of a band saw mill and which is provided with means for truing up the faces of the wheels, means also being provided for polishing the faces at the time that they are trued in order that they may be put in proper condition to serve as bearings for holding the saw against its work.

With the above object in view, the machine includes arms having center pins adapted to be screwed into the center of the shaft upon which the wheel to be dressed is mounted. Hooks are also provided whereby the said arms are held in position while they are being secured to the shaft. A beam is adjustably supported by the arms and upon the beam a bed is slidably mounted. Means is provided for securing the said bed in adjusted position. A carriage is slidably mounted upon the bed and a power operated means is provided for moving the carriage. A manually operable means is provided for controlling the direction in which the carriage shall move over the bed. A tool supporting head is slidably mounted upon the carriage and a grinder supporting head is mounted upon the carriage. Means is provided for rotating the grinder from parts attached to the bed as the carriage moves back and forth over the same.

In the accompanying drawings:—Figure 1 is a top plan view of the machine attached to a shaft. Fig. 2 is a front elevation of a portion of the machine. Fig. 3 is a transverse sectional view of a portion of the machine cut on the line 3—3 of Fig. 1. Fig. 4 is a similar view on the line 4—4 of Fig. 1. Fig. 5 is a similar view and on the line 5—5 of Fig. 1.

The wheel refacing machine consists of arms 1 having screw threaded therein pins 2 which are adapted to be applied to the center of the shaft carrying the wheel to be dressed. Hooks 3 are also attached to the arms 1 and are adapted to engage bolts of the bearings in which the shaft is journaled. The arms 1 are provided in the vicinity of their outer ends with openings 4 which receive a beam 5 which is preferably of the I-type, although any other form of beam may be used, and is held in position in a direction transversely of the arms 1 by means of set screws 6, and in position in a direction longitudinally of the arms 1 by means of set screws 7. Therefore it will be seen that the beam 5 may be adjusted and secured in position with relation to the arms 1, whereby the said arms may be positioned upon the beam 5 relatively near or relatively remote from each other. A bed 8 is slidably mounted upon the beam 5 and may be held in an adjusted position by means of set screws 9. The bed 8 may also be provided with set screws 10 adapted to be used to assist in holding it in a fixed position upon the beam 5, although any other securing means may be provided in lieu of the set screws.

A transverse shaft 11 is journaled for rotation at one end of the bed 8 and has a beveled gear wheel 12 fixed to its inner end, a hand wheel 13 being fixed to the outer end of the shaft. A longitudinal shaft 14 is journaled at one end upon the bed 8 and is restrained, except to a limited extent, against longitudinal movement with relation to the said bed. At its other end the shaft 14 is journaled in one of the arms 1 and may slide in its bearing thereon. In the vicinity of the bevel gear wheel 12, the shaft 14 is provided with spaced beveled gear wheels 15 and 16 which are located at a distance apart greater than the diameter of the beveled gear wheel 12, and as the shaft 14 is shifted longitudinally one or the other of the said beveled gear wheels 15 or 16 is brought into mesh with the beveled gear wheel 12. A belt pulley 17 is adjustably fixed to the shaft 14 and may be driven by a belt from a main wheel shaft or from any adjacent source not shown.

Collars 18 are adjustably fixed to the shaft 14 and between the said collars is loosely journaled a collar 19 having diametrically oppositely disposed pins or studs 20. A plate 21 is adjustably mounted upon the beam 5 and may be held in adjusted position by means of set screws 22 or equivalent devices, and a lever 23 is fulcrumed upon the said plate 21. The plate 21 is provided upon its upper surface and in the vicinity of its outer end with a series of teeth 24 which may be engaged by the lever 23 whereby the latter is held in an adjusted position upon its fulcrum. The inner end of the lever 23 is bifurcated as at 25 and the said bifurcations straddle the sleeve 19 and are provided with slots 26 to receive the studs 20. Therefore it will be seen that while the shaft 14 is in a state of rotation an operator may swing the lever 23 so that the said shaft may be moved slightly in the direction of its longitudinal axis and therefore one or the other of the wheels 15 or 16 may be brought into mesh with the beveled wheel 12 upon the shaft 11, and notwithstanding the fact that the shaft 14 rotates constantly in the same direction, the shaft 11 may be rotated in either of two directions.
Furthermore the lever 23 may be swung so that both of the gear wheels 15 and 16 are out of mesh with the gear wheel 12 and therefore the shaft 11 is free to be turned by an operator using the hand wheel 13.
This is sometimes desirable in order to properly position the facing tools hereinafter to be described, prior to the power operation of the machine as has heretofore been explained. A longitudinally disposed screw shaft 27 is journaled upon the bed 8 but is restrained against longitudinal movement with relation to the same. The shaft 27 is provided at one end with a beveled gear wheel 28 which meshes with a beveled gear wheel 29 mounted upon the shaft 11.

A carriage 30 is slidably mounted upon the bed 8 and is provided with a threaded lug 31 which receives the screw shaft 27. The bed 8 is provided with tracks 32 which serve as guides for the carriage 30, the latter being provided with a wear plate 33 which is adapted to operate against the sides of one of the tracks 32 and which may be adjusted in proper position by means of set screws 34 which pass through the carriage 30 and bear at their inner ends against the said wear plate 33. A head block 35 is slidably mounted upon the carriage and is controlled by a hand screw 36 in a manner commonly resorted to in turning lathes and similar machines. Also the head block 35 carries a tool bit 37 of usual pattern. A head block 38 is also slidably mounted upon the carriage 30 and is controlled by a hand screw 39. A shaft 40 is journaled upon the head block 38 and is provided at one end with a grinder or abrading disk 41. A bracket 42 is attached to the carriage 30 and the outer end of the shaft 40 is journaled in the said bracket. A belt pulley 43 is fixed to the shaft 40 and is located within the opposite sides of the bracket 42. Brackets 44 depend from the bed 8 and a shaft 45 is journaled for rotation at the lower ends of the brackets 44. An elongated belt pulley 46 is mounted upon the intermediate portion of the shaft 45 and a driving belt pulley 47 is mounted upon one end of the shaft 45. A twisted belt 48 passes around the pulleys 46 and 43 and as the carriage 30 moves longitudinally along the head 8 the belt 48 may slide or move along the relatively long belt pulley 46. At its ends the shaft 45 is journaled in boxes 49 which are slidably mounted upon the lower ends of the brackets 44 and which are held in adjusted position upon the said brackets by means of thrust screws 50, the said boxes 49 being also provided with set screws 51 which are adapted to hold the said boxes in adjusted positions upon the brackets 44.

Presuming that the wheel 53 is the one which needs dressing at its periphery and is mounted upon a shaft 52 which in turn is journaled in the boxes 54 engaged by the hook 3 and the said wheel 53 and shaft 52 are in rotation. The arms 1 are properly adjusted upon the beam 5 and the pointed ends of the pins 2 are screwed into the centers of the ends of the shaft 52. The bed 8 is positioned upon the beam 5 so that it extends transversely across the plane of the wheel 53. Also the plate 21 is properly positioned and fixed to the beam 5. As the shaft 11 rotates in the manner hereinbefore described rotary movement is transmitted through the intermeshing gear wheels 28 and 29 to the screw shaft 27. Through the said screw shaft the carriage 30 is moved longitudinally of the bed 8. The direction in which the said carriage 30 moves is controlled by an operator who swings the lever 23 as above described. Prior to the movement of the carriage 30 the block 35 has been properly positioned upon the said carriage in order that the tool bit 37 carried thereby will engage the face of the wheel 53 and remove a proper cut from the same. Also the block 28 has been properly positioned in order that the grinder 41 may engage the face periphery of the wheel 31 and grind or polish the same after the said cut has been removed. The cutting and grinding operations may be accomplished at the same time or at different times as desired and by providing the belt 14 with one or more twists the said belt may move about one or the other side of the long pulley 46 whereby the grinder 41 may be rotated in either of two directions. As these are merely examples of the manner in which the machine may be operated or manipulated, it being understood that there are other methods of manipulation which are unnecessary to describe here but which are apparent to the artisan familiar with such work.

Having described the invention, what I claim as new and desire to secure by Letters Patent is:

1. A refacing machine comprising a support, a bed adjustably mounted thereon, a carriage slidably mounted upon the bed, a screw shaft journaled upon the bed and operatively engaging the carriage, a transverse shaft journaled upon the bed and operatively connected with the screw shaft, a longitudinal shaft slidably journaled upon the bed and operatively connected with the transverse shaft, and means for imparting movement to the slidable shaft, whereby to reverse the rotation of the transverse shaft.

2. A refacing machine comprising a support, a bed adjustably mounted thereon, a carriage slidably mounted upon the bed, a screw shaft journaled upon the bed and operatively engaging the carriage, a transverse shaft journaled upon the bed and operatively connected with the screw shaft, a longitudinal shaft slidably journaled upon the bed and operatively connected with the transverse shaft, a plate adjustably mounted upon the support, and a lever fulcrumed to the plate and operatively connected with the slidable shaft, whereby the latter may be moved longitudinally to reverse the rotation of the transverse shaft.

In testimony that I claim the foregoing as my own, I have hereto affixed my signature in the presence of two witnesses.

HANNIBAL D. FIELDS.

Witnesses:
J. P. CAMPBELL,
F. B. OCHSENREITER.

---

Copies of this patent may be obtained for five cents each, by addressing the "Commissioner of Patents, Washington, D. C."